United States Patent
Mangano et al.

(10) Patent No.: US 11,135,677 B2
(45) Date of Patent: Oct. 5, 2021

(54) LASER WELDING OF COMPONENT

(71) Applicant: General Electric Company, Schenectady, NY (US)

(72) Inventors: Fabrizio Mangano, Dottikon (CH); Piero-Daniele Grasso, Niederweningen (CH); Norbert Lucke, Neuenhof (CH); Michael Seemann, Laufenburg (DE)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 15/913,180

(22) Filed: Mar. 6, 2018

(65) Prior Publication Data
US 2019/0275611 A1    Sep. 12, 2019

(51) Int. Cl.
*B23K 26/26*    (2014.01)
*B23K 35/02*    (2006.01)
(Continued)

(52) U.S. Cl.
CPC .......... *B23K 26/26* (2013.01); *B23K 26/0006* (2013.01); *B23K 26/34* (2013.01); *B23K 26/60* (2015.10); *B23K 26/702* (2015.10); *B23K 35/0261* (2013.01); *B23P 6/007* (2013.01); *B23P 6/04* (2013.01); *C22F 1/10* (2013.01);
(Continued)

(58) Field of Classification Search
CPC .......................... B23K 2101/001; B23K 26/34
See application file for complete search history.

(56) References Cited

U.S. PATENT DOCUMENTS

| 5,900,170 A | 5/1999 | Marcin, Jr. et al. |
| 8,119,948 B2 * | 2/2012 | Causte ................. B23K 1/0018 |
| | | 219/121.64 |

(Continued)

FOREIGN PATENT DOCUMENTS

| EP | 0740976 A1 | 11/1996 |
| EP | 1674658 A1 | 6/2006 |

(Continued)

OTHER PUBLICATIONS

European Search Report issued in connection with corresponding EP Application No. 19161140.9 , dated Jul. 15, 2019, 6 pages.

(Continued)

*Primary Examiner* — Erin E McGrath
(74) *Attorney, Agent, or Firm* — James Pemrick; Hoffman Warnick LLC

(57) ABSTRACT

Methods of repair of a component or adding material to a component using laser welding are disclosed. One method may include repairing or adding material to the component by laser irradiating a wire material with a laser in an inert gas in a vicinity of the component. The laser irradiating the wire material includes modulated pulsing the laser through: a warm up phase during which an on-power of the laser is increased over time to a maximum target on-power, a melt and bond phase during which the wire material is melted and during which the on-power is less than the maximum target on-power, and a stress releasing phase during which the on-power of the laser is less than the on-power during the melt and bond phase. The laser irradiated wire material forms a weld material to repair a damaged area or add material to the component.

13 Claims, 16 Drawing Sheets

(51) Int. Cl.
    *B23P 6/04*      (2006.01)
    *B23K 26/60*     (2014.01)
    *B23P 6/00*      (2006.01)
    *F01D 5/00*      (2006.01)
    *C22F 1/10*      (2006.01)
    *B23K 26/34*     (2014.01)
    *B23K 26/00*     (2014.01)
    *B23K 26/70*     (2014.01)
    *B23K 103/18*    (2006.01)
    *B23K 101/00*    (2006.01)
    *B23K 103/00*    (2006.01)
    *B23K 101/34*    (2006.01)

(52) U.S. Cl.
    CPC ........ *F01D 5/005* (2013.01); *B23K 2101/001* (2018.08); *B23K 2101/34* (2018.08); *B23K 2103/26* (2018.08); *B23K 2103/52* (2018.08)

(56) References Cited

U.S. PATENT DOCUMENTS

| | | | |
|---|---|---|---|
| 9,488,053 | B2 | 11/2016 | Schmitt et al. |
| 2007/0023403 | A1 | 2/2007 | Emiljanow |
| 2011/0052386 | A1 | 3/2011 | Schoonover et al. |
| 2012/0132627 | A1* | 5/2012 | Wescott ................ B22F 3/1055 219/121.66 |
| 2015/0336208 | A1 | 11/2015 | Sokol et al. |
| 2016/0175991 | A1* | 6/2016 | Kottilingam .......... C22C 19/056 219/121.13 |
| 2019/0047094 | A1 | 2/2019 | Puidokas et al. |

FOREIGN PATENT DOCUMENTS

| | | |
|---|---|---|
| EP | 1743729 A2 | 1/2007 |
| EP | 2295189 A1 | 3/2011 |
| GB | 2473111 A | 3/2011 |
| WO | 2005007785 A2 | 1/2005 |

OTHER PUBLICATIONS

European Search Report issued in connection with corresponding EP Application No. 19161139.1, dated Jul. 19, 2019, 7 pages.
Notice of Allowance dated Aug. 28, 2019 for U.S. Appl. No. 15/913,185, filed Mar. 6, 2018; 14 pages.

* cited by examiner

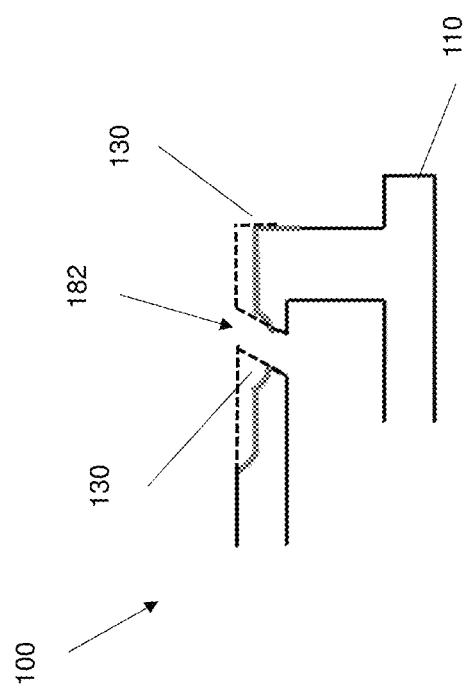

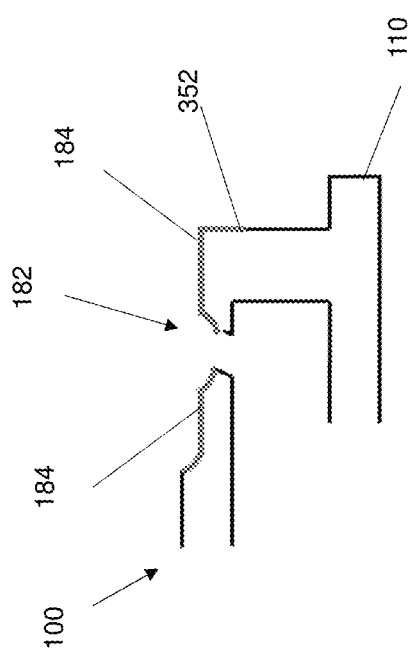

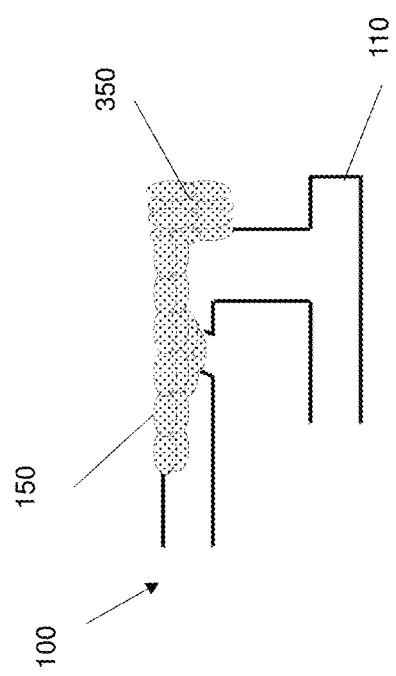

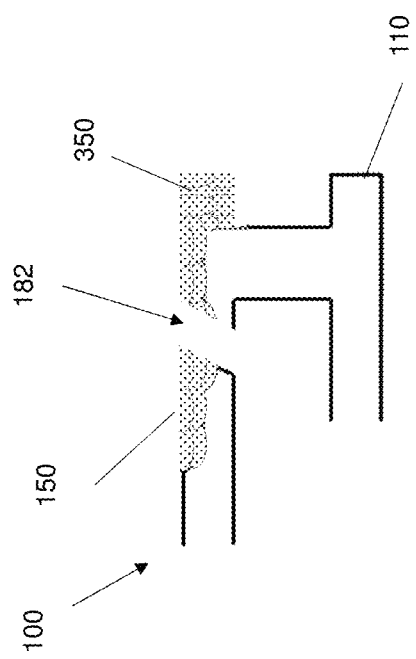

LASER WELDING OF COMPONENT

CROSS-REFERENCE TO RELATED APPLICATIONS

This application is related to U.S. application Ser. No. 15/913,185, filed concurrently and currently issued as U.S. Pat. No. 10,486,272 and hereby incorporated by reference in its entirety.

FIELD OF THE INVENTION

The subject matter disclosed herein relates to repair or adding of material to a component using laser welding.

BACKGROUND OF THE INVENTION

Gas turbines, in particular aircraft engines, must meet exceedingly stringent requirements in terms of reliability, weight, performance characteristics, and surface life. Various turbine components are subjected to hot gases and wear, which can cause high stresses. To protect such turbine components, various exterior surface coatings are applied over the base materials thereof. Exterior surface coatings refer to coatings such as but not limited to hardface coatings, and anti-oxidation coatings like an overlay coating and/or a bond coating. A thermal barrier coating (TBC) may also be disposed over a bond coating. During surface life, cracks can form in the exterior surface coating(s) and can damage the exterior surface coating(s) and/or the base material of the turbine component. The exterior surface coating can also be oxidized and/or damaged due to wear. The damage may weaken the turbine component and/or alter the shape of the turbine component.

Repairing gas turbine components can be costly and time consuming. For example, many repairs require removal of at least some of the exterior surface coatings and large, time consuming material removal and replacement, e.g., using additively manufactured coupons. Where material is replaced, the process oftentimes requires exposure of the turbine component to a high temperature heat treatment, which can damage other parts of the component. The repair itself can also oxidize the exterior surface coatings and/or other parts of the turbine component that are not removed. No solution is currently available to adequately repair a turbine component where the repair is made of suitable material, the process avoids a heat treatment at high temperature during the repair, and/or the repair can address the presence of an exterior surface coating on the component.

BRIEF DESCRIPTION OF THE INVENTION

Various aspects of the disclosure include approaches for repairing a component or adding material to an area of a component.

A first aspect includes a method for repairing a component, the method comprising: providing the component, the component having: an exterior surface coating disposed on a base material, and a damaged area in at least one of the exterior surface coating and the base material; and repairing the damaged area by advancing a first wire material into the damaged area while first laser irradiating the first wire material with a laser in an inert gas in a vicinity of the damaged area, wherein the first laser irradiating the first wire material includes modulated pulsing the laser through: a first warm up phase during which an on-power of the laser is increased over time to a maximum target on-power for the first laser irradiating, a first melt and bond phase during which the wire material is melted and during which the on-power for the first laser irradiating is less than the maximum target on-power for the first laser irradiating, and a first stress releasing phase during which the on-power of the laser is less than the on-power during the melt and bond phase, wherein the first laser irradiated wire material forms a first weld material in the damaged area.

A second aspect of the disclosure includes a method for repairing a component, the method comprising: providing the component, the component having a base material having a damaged area; and repairing the damaged area by advancing a wire material into the damaged area while first laser irradiating the wire material with a laser in an inert gas in a vicinity of the damaged area, wherein the laser irradiating the wire material includes modulated pulsing the laser through: a warm up phase during which an on-power of the laser is increased over time to a maximum target on-power for the laser irradiating, a melt and bond phase during which the wire material is melted and during which the on-power for the laser irradiating is less than the maximum target on-power for the laser irradiating, and a stress releasing phase during which the on-power of the laser is less than the on-power during the melt and bond phase, wherein the laser irradiated wire material forms a weld material in the damaged area.

A third aspect of the disclosure includes a method, comprising: providing a component, the component having a base material; adding material to an area of the component by laser irradiating a wire material with a laser in an inert gas in a vicinity of the area of the component, wherein the laser irradiating the wire material includes modulated pulsing the laser through: a warm up phase during which an on-power of the laser is increased over time to a maximum target on-power for the laser irradiating, a melt and bond phase during which the wire material is melted and during which the on-power for the laser irradiating is less than the maximum target on-power for the laser irradiating, and a stress releasing phase during which the on-power of the laser is less than the on-power during the melt and bond phase, wherein the irradiated wire material forms a weld material on the area of the component.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 13 shows a schematic depiction of a component having a damaged area according to various embodiments of the disclosure.

FIG. 14 shows a schematic depiction of the component of FIG. 13 subjected to a machining operation according to various embodiments of the disclosure.

FIG. 15 shows a schematic depiction of the component of FIG. 14 having weld material in the damaged area and added material on another area according to various embodiments of the disclosure.

FIG. 16 shows a schematic depiction of the component of FIG. 15 subjected to a machining operation, creating a repaired damage area and a new material area, according to various embodiments of the disclosure.

Figure 1:
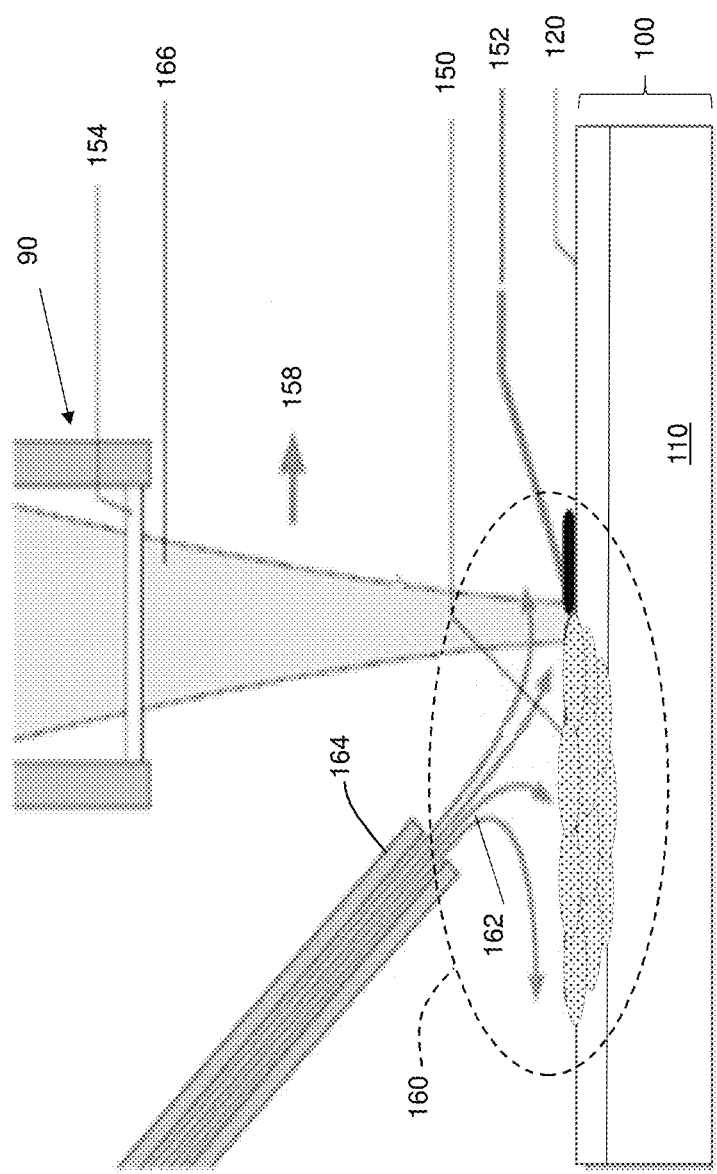
FIG. 1 shows a schematic diagram of modulated pulsed laser repair apparatus for carrying out methods according to various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

The subject matter disclosed herein relates to repairing or adding material to a component such as a turbine component. Embodiments of a method for repairing a component may include providing the component having an exterior surface coating disposed on a base material. Where repair is needed, the component may also include a damaged area in at least one of the exterior surface coating and the base material. The repair may include advancing a wire material into the damaged area while laser irradiating the wire material with a laser in an inert gas in a vicinity of the damaged area. The laser irradiating may include modulated pulsing the laser through: a first warm up phase during which an on-power of the laser is increased over time to a maximum target on-power for the first laser irradiating, a first melt and bond phase during which the wire material is melted and during which the on-power for the first laser irradiating is less than the maximum target on-power for the first laser irradiating, and a first stress releasing phase during which the on-power of the laser is less than the on-power during the melt and bond phase. The laser irradiated wire material forms a weld material in the damaged area. Alternatively, the laser irradiated wire material may add material to an area of the component.

One of the advantages of the process described herein is the extremely low heat input into the welding zone compared to conventional processes. This allows welding of a wide range of base materials (e.g., high gamma prime materials) and components having complex shapes with critical geometries. The process described herein produces little retained stress in the component after welding. Therefore, no heat treatments are required before or after welding. Further advantages are simplified handling, as components do not have to be inserted in ovens for heat treatment. This is beneficial for components that are heavy and large, as any simplified handling procedures reduce cost and time for the repair. Another advantage is the possibility to weld using a wire which has a composition similar to a bond coat.

FIG. 1 is a schematic depiction showing a laser system 90 used to repair a component 100 or add weld material to component 100 using a modulated pulsed laser. As used herein, "modulated pulse" indicates the amplitude, frequency, phase and/or intensity of the laser can be varied in accordance with another signal. Component 100 may include a metal alloy gas turbine component. However, while teachings of the disclosure will be applied to a gas turbine component, it is emphasized that they may be applied to any component, i.e., the methods are applicable to a wide variety of metal alloy components that are not necessarily used in a gas turbine. In this embodiment, component 100 has a base material 110 and a protective exterior surface coating(s) 120. As will be described in certain embodiments, at least exterior surface coating(s) 120 has been damaged. The damaged area may be caused by the loss, oxidation or wear or cracking or spalling of exterior surface coating(s) 120. The damaged area can extend into base material 110.

Base material 110 can include an alloy, such as a high-gamma prime superalloy. Examples include gamma prime (γ') precipitation-strengthened nickel-based superalloys or cobalt-based superalloys. "Gamma prime" (γ') is the primary strengthening phase in nickel-based alloys. Each of these alloys has a relatively high gamma prime (principally $Ni_3(Al,Ti)$) content as a result of containing significant amounts of aluminum and/or titanium. Nickel-based superalloys may include but are not limited to: IN738LC, IN625, IN739, CM-247-LC, MarM247, MarM509, CMSX-4, GTD 111, GTD 222, GTD 444, HASTELLOY X, MK4, Rene N5, Rene N4, Rene 80, Rene 108, Rene 125, MD2, and Haynes 230. Cobalt-base superalloys may include but are not limited to: FSX-414 and X45.

Exterior surface coating(s) 120 may include an overlay coating, a bond coating and/or a hardface coating. The overlay coating or bond coating may include any now known or later developed overlay of bond coating material such as but not limited to: MCrAlY, where M may be nickel (Ni) or cobalt (Co), cobalt nickel (CoNi) or nickel cobalt (NiCo). Exterior surface coating(s) 120 may alternatively include a hardface coating such as but not limited to: chromium carbide ($Cr_3C_2$) or tungsten carbide (WC), which may be commercially available as Stellite 6, Triballoy 800, Amdry 718, Amdry 625, Diamalloy 1005 or Diamalloy 1006.

In some embodiments, a thermal barrier coating (TBC) (not shown) may be positioned over exterior surface coating(s) 120 such as a bond coating. The TBC may include any now known or later developed TBC material such as but not limited to: yttria-stabilized zirconia (YSZ) (e.g., Amperite 827), mullite or alumina.

Modulated pulsed laser welding according to embodiments of the disclosure includes creating a weld material 150 from a wire material 152. Wire material 152 is in contact with a repair zone or an area to have material added, and is melted by exposure to laser radiation. An operator can manually feed wire material 152 under laser radiation, or the wire material feed can be fed in any now known or later developed automated process. Laser 154 emits laser radiation 166 in a specified modulated pulse onto wire material 152. Modulated pulsed laser radiation 166 generates heat at wire material 152 which melts wire material 152 and provides weld material 150 (into the repair zone or area to have material added) for bonding the weld material to component 100. As will be described in greater detail herein, where a repair is being made (shown in FIG. 1), weld material 150 fills the repair zone, attaching to base material 110 and/or exterior surface coating(s) 120 of component 100. Where material is being added to component 100 (shown in FIGS. 13-16), weld material 150 bonds to base material 110 of component 100. In embodiments, base material 110 may be partially melted during the laser irradiation. Because of the modulated pulsed nature of the laser irradiation described below, wire material 152 and a limited region of base material 110 melts with a limited heat input into component 100. Laser 154 is moved in the direction indicated by arrow 158. Wire material 152 is advanced in the same direction 158 as laser 154.

During the welding process, welded area 160 is shielded with an inert gas 162 through nozzle 165 in the vicinity of component 100, e.g., near a damaged area thereof or an area upon which material is to be added. Nozzle 164 directs inert gas 162, shown as arrows, over welding area 160 to prevent oxidation. Inert gas 162 may be argon, argon-hydrogen or nitrogen. Because an inert gas is provided over the welding area 160, component 100 does not need to be in an enclosure filled with inert gas.

Figure 2:
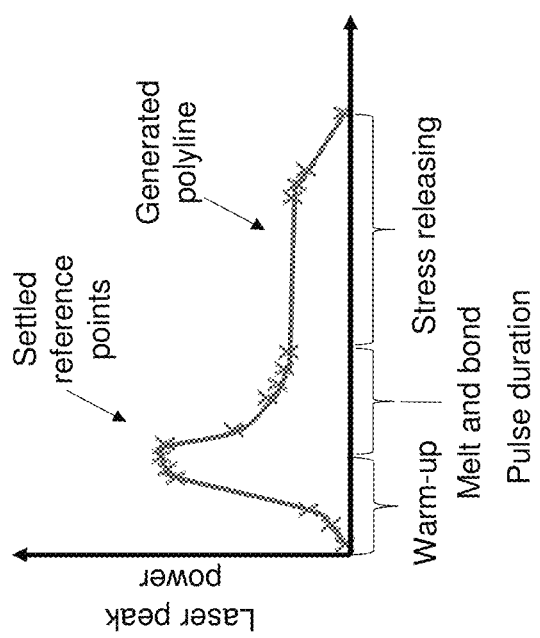
FIG. 2 shows a graphical representation of power versus time for a modulated pulsed laser according to various embodiments of the disclosure.

The modulated pulse laser radiation according to embodiments of the disclosure eliminates the need of pre-heat and post-heat treatment of component 100 as well as heating component 100 during the welding process. Laser 154 may be a solid-state laser. A solid state laser uses a gain medium that is a solid. State of the art modulated pulse shapes have a rectangular modulated pulse profile with an abrupt increase and decrease of the laser peak power. Initial abrupt peak power can lead to stress and weld defects. The power characteristics of the laser irradiation used in embodiments of the disclosure is shown in FIG. 2. The power is adapted to the wire material weldability and extent of a damaged area to be repaired or an amount of material to be added.

In accordance with embodiments of the disclosure, a laser irradiation of wire material 152 includes modulated pulsing the laser through a number of different phases. Each of the phases of the modulated pulse in FIG. 2 can be extended or reduced in duration. In accordance with embodiments of the disclosure, an initial (first) phase includes a warm up phase during which an on-power of laser 154 is increased over time to a maximum target on-power for the first laser irradiating, i.e., a maximum power desired for the welding (not necessarily the maximum power of the laser). This phase avoids immediate peak power which can lead to stress welding defects. A second phase includes a melt and bond phase during the wire material is melted and during which the on-power for the laser irradiating is less than the maximum target on-power. During this phase, the weld material is bonded to component 100, i.e., to exterior surface coating(s) 120 and/or base material 110. The melt and bond phase uses approximately 50% to 90% of the maximum target on-power of the first laser irradiating. During the melt and bond phase, the on-power may be slowly reduced as wire material 152 melts. The final phase includes a stress releasing phase during which the on-power of the laser is less than the on-power during the melt and bond phase. In one example, so long as the on-power is less than the melt and bond phase level, the stress releasing phase may use up to 80% of the laser on-power. In another example, so long as the on-power is less than the melt and bond phase level, the stress releasing phase may less than 50% of the laser on-power. During this latter phase, heat is dispersed throughout component 100 and stress relaxation in the component occurs. As a result, and as will be described in greater detail herein, laser irradiated wire material 152 forms weld material 150 in a damaged area of component 100, or is added to an area of component 100. The laser irradiating can be repeated to create different layers. For example, a first laser irradiating may be performed with a first set of laser welding phases, and second laser irradiating may be performed thereafter with a second set of laser welding phases, the latter set of laser welding phases perhaps having different operational conditions than the first set.

In terms of duration, the warm-up phase expends from approximately 0.1 to 5 percent of the laser irradiating total duration, i.e., the total time the laser is heating wire material 152. The melt and bond phase expends from approximately 4.9 percent to approximately 30 percent of the laser irradiating total duration. The stress releasing phase expends from approximately 65 percent to approximately 95 percent of the laser irradiating total duration. Each phase of the modulated pulse in FIG. 2 may be extended or reduced in duration, e.g., depending on wire material 152, component geometry, etc. The modulated pulse shown in FIG. 2 is a fitted polyline using settled reference points in terms of peak power/modulated pulse time. In this way, the modulated pulse profile has a continuous and smooth evolution.

The process disclosed herein avoids pre-welding heat treatment and post-welding heat treatment. The duration of the modulated pulse is from between approximately 100 milliseconds (ms) to approximately 100 ms, or in some embodiments from approximately 45 ms up to approximately 85 ms. By modulating the signal to create the modulated pulse of the laser irradiation, every single modulated pulse can be adjusted. The shape of each modulated pulse can be controlled. The modulated pulse curve may be adapted to the wire material weldability and the maximum heat input provided to component 100.

In embodiments, laser radiation 166 circular spot size on the wire material, during the welding process, is from approximately 100% of wire material 152 diameter to about 130% of the wire material diameter. This arrangement provides a smooth distribution of the energy over the entire wire and avoids any damage from hot spots.

The main process parameters of modulated pulsed laser wire welding and their correlation with welding quality are as follows. The laser peak power is dependent on wire material 152 and diameter. Wire material 152 diameter is between approximately 0.1 and approximately 1.0 mm. As will be described, different type of wire materials 152 can be used for the wire. The peak power value is normally between approximately 0.5 kilowatts (kW) to approximately 3 kW. The modulated pulse shape may be defined according to the base material sensitivity to cracks.

The translation speed of the laser during the welding is chosen in combination with the laser frequency in order to achieve the target spot to spot overlap. The laser frequency is defined according to the translation speed in order to achieve the required spot to spot overlap between 2 consecutive laser shots for a reliable and uniform welding bonding. The laser frequency may be, for example, from approximately 2 hertz (Hz) up to approximately 20 Hz.

Some advantages of this technique are the high position accuracy and the process flexibility due to controlled operation of wire material 152 and laser 154.

Turning to FIGS. 3-16, various embodiments of a method of repairing a damaged area in at least an exterior surface coating of component 100, or a method of adding weld material to component 100, are shown. Each embodiment employs a form of the laser irradiation technique described previously.

Figure 3:
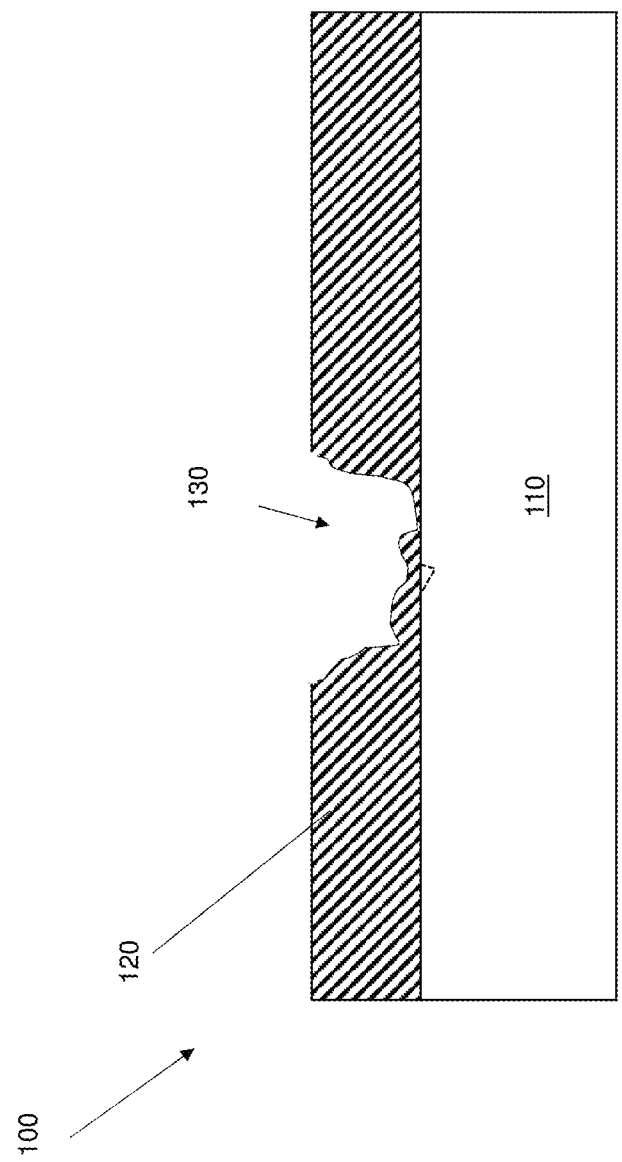
FIG. 3 shows a schematic depiction of a component having a damaged area in at least an exterior surface coating according to various embodiments of the disclosure.
Figure 4:
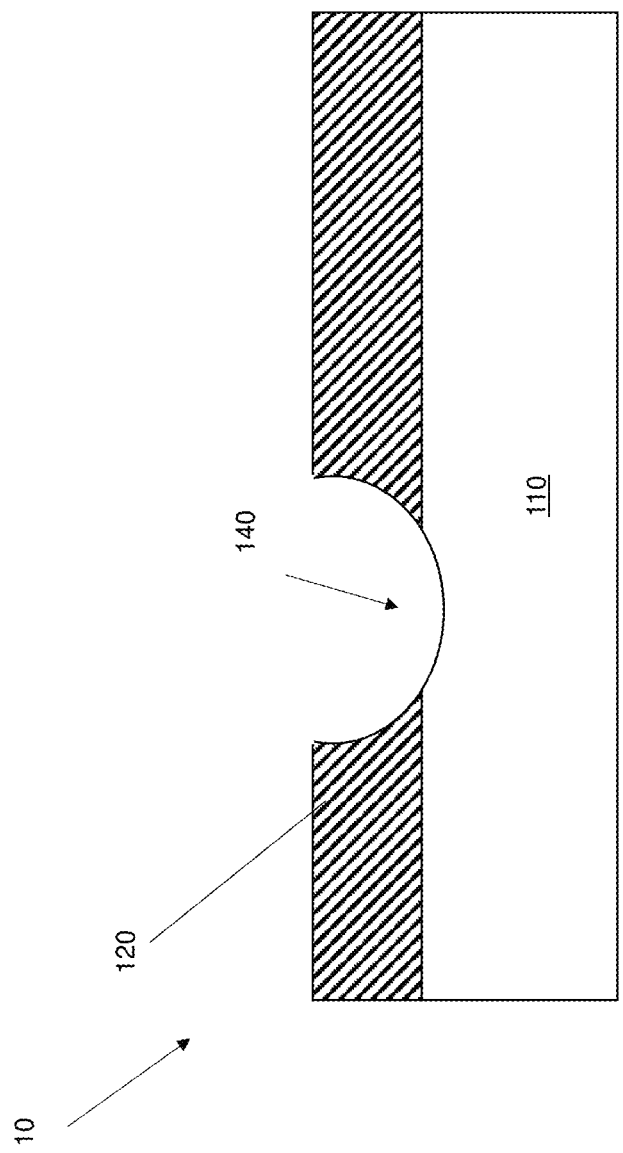
FIG. 4 shows a schematic depiction of the component of FIG. 1 having the damaged area subjected to machining according to various embodiments of the disclosure.

FIGS. 3-6 show an embodiment of repairing a damaged area in exterior surface coating(s) 120. FIG. 3 shows a sectional view of component 100 including a damaged area 130 in at least exterior surface coating(s) 120. Damaged area 130 of component 100 may be identified through visual inspection or non-destructive testing (NDT) inspection. In embodiments, as described herein, wire material 152 (FIG. 1) may be contacted with damaged area 130 (FIG. 1) during the laser irradiation. Local machining, such as but not limited to grinding, of damaged area 130 (FIG. 1) may be optionally performed to provide a clean and smooth surfaced area in order to repair damaged area 130 in exterior surface coating(s) 120 and/or base material 110 of component 100. The result of such machining is shown in FIG. 4 as a repair zone 140. Providing repair zone 140 with smooth surface area may prevent contamination or inclusion, and ensures no bonding defects in the subsequent repair. Machining may be deep enough in component 100 to remove any damage. In embodiments (shown in FIG. 4), repair zone 140 may extend into base material 110. However, in other embodiments, repair zone 140 does not extend into base material 110.

As noted, removal of damaged area 130 in FIG. 3 is through machining. The machining, such as grinding, may be done manually and/or with a computer numerical controller (CNC) machine or any other computer controlled machining process. The machining removes damaged area 130 (FIG. 3) of exterior surface coating(s) 120 and may extend into base material 110 creating repair zone 140 having smooth sides. The machining to create repair zone 140 may be inspected visually or through NDT to be sure all damaged area 130 (FIG. 3) in exterior surface coating(s) 120 is removed. Where grinding is performed, it may be completed with, for example, carbide tools.

The extent of the machining of damaged area 130 (FIG. 3) to create repair zone 140 depends on a depth of the damaged area, the turbine component geometry (e.g., thickness) and scope of repair in general. Repair zone 140 in FIG. 4 can be in any shape, for example, a half sphere (for spot damages), a groove (for linear damage) or a planar surface (for a more extensively damaged area).

Figure 5:
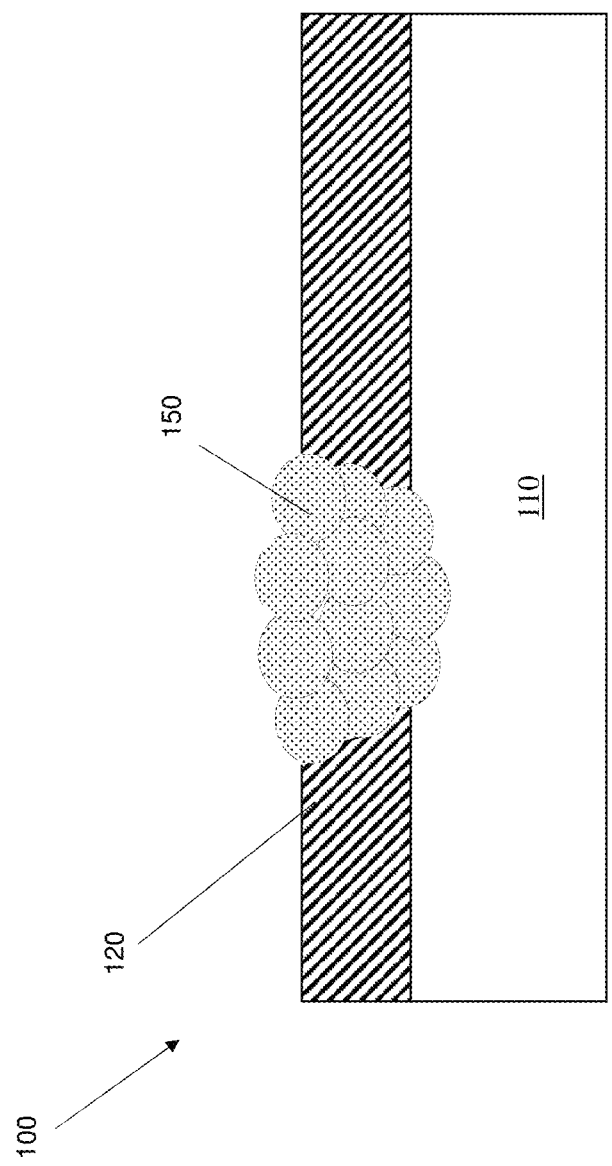
FIG. 5 shows a schematic depiction of the component of FIG. 2 having weld material in a damaged area thereof according to various embodiments of the disclosure.

FIG. 5 shows local welding of a weld material 150 by modulated pulsed laser welding, as described herein. Additional weld materials 250, 350 are illustrated and described in further detail with respect to FIGS. 7, 8, 15 and 16. One or more layers of weld material 150 may be applied in repair zone 140 (FIG. 4) in direct contact with exterior surface coating(s) 120 (shown) and/or base material 110. As will be described, other layers of weld material 150 may be applied in repair zone 140 in contact with exterior surface coating(s) 120, and the two or more layers of weld material can be of different compositions.

The composition of weld material 150, 250, 350 and corresponding wire material 152 depends on the repair scope and application (i.e., anti-oxidation coating repair, base material built-up, etc.). In some embodiments, damaged area 130 (FIG. 3) may extend only into exterior surface coating(s) 120. In this case, weld material 150 is selected to repair the exterior surface coating(s) 120 only, and may have the same chemical composition of exterior surface coating(s) 120 listed above. For example, wire material 152 for weld material 150 may include, for overlay coating or bond coating: MCrAlY, where M may be nickel (Ni) or cobalt (Co), cobalt nickel (CoNi) or nickel cobalt (NiCo); and for a hardface coating: chromium carbide ($Cr_3C_2$) or tungsten carbide (WC), which may be commercially available as Stellite 6, Triballoy 800, Amdry 718, Amdry 625, Diamalloy 1005 or Diamalloy 1006. In other embodiments, weld material 150, 250, 350 is selected to repair base material 110, and may have the same chemical composition of exterior surface coating(s) 120 listed above. For example, wire material 152 for weld material 150 may include, for base material 110 of nickel-based superalloys: IN738LC, IN625, IN739, CM-247-LC, MarM247, MarM509, CMSX-4, GTD 111, GTD 222, GTD 444, HASTELLOY X, MK4, Rene N5, Rene N4, Rene 80, Rene 108, Rene 125, MD2, and/or Haynes 230; and for cobalt-base superalloys: FSX-414 and/or X45. In another example, base material 110 may be repaired with a wire material having a composition of exterior surface coating 120 such as: MCrAlY, where M may be nickel (Ni) or cobalt (Co). Where exterior surface coating(s) 120 are formed after base material 110, they can have the compositions listed above.

Figure 6:
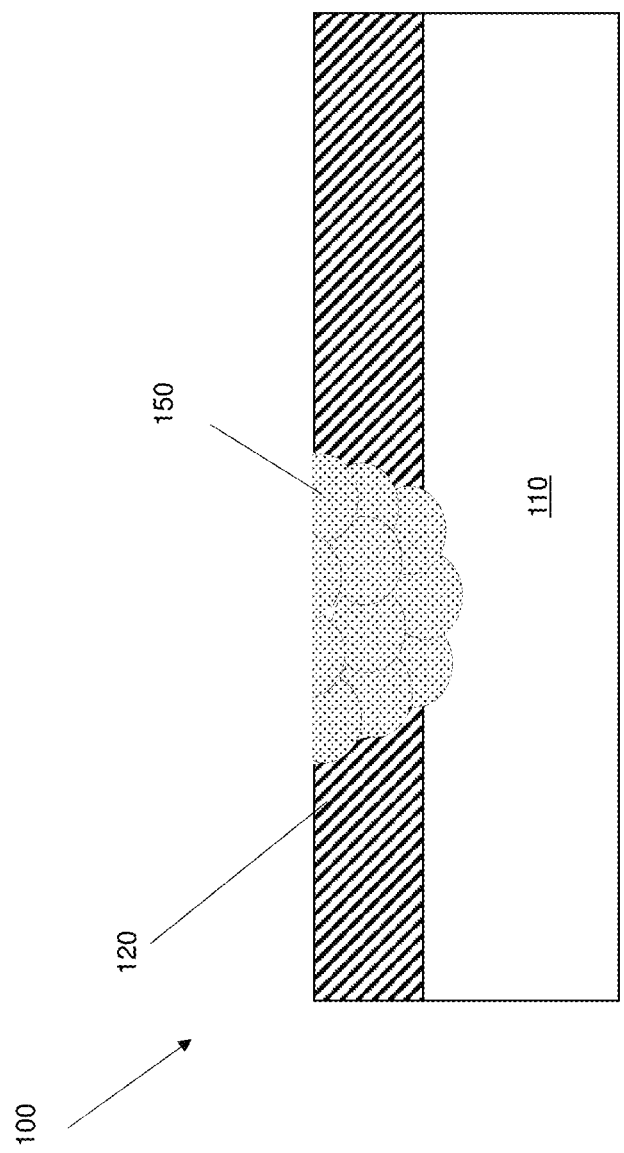
FIG. 6 shows a schematic depiction of a repaired component according to various embodiments of the disclosure.

As shown in FIG. 6, component 100 has been returned to its shape prior to damage causing damaged area 130 (FIG. 3) existing in exterior surface coating(s) 120. After weld material 150 has been added to repair zone 140 (FIG. 4), excess weld material 150 may be removed by manual and/or CNC machining, e.g., grinding, until the shape of the component is restored. A further advantage of the process disclosed herein is the very limited machining effort required because of the near net shape nature of weld material 150. The repair shown in FIGS. 2-6 allows repair only in the damaged area of exterior surface coating(s) 120. The repair shown in FIG. 6 restores exterior surface coating(s) 120 and the properties associated with the exterior surface coating(s).

Figure 7:
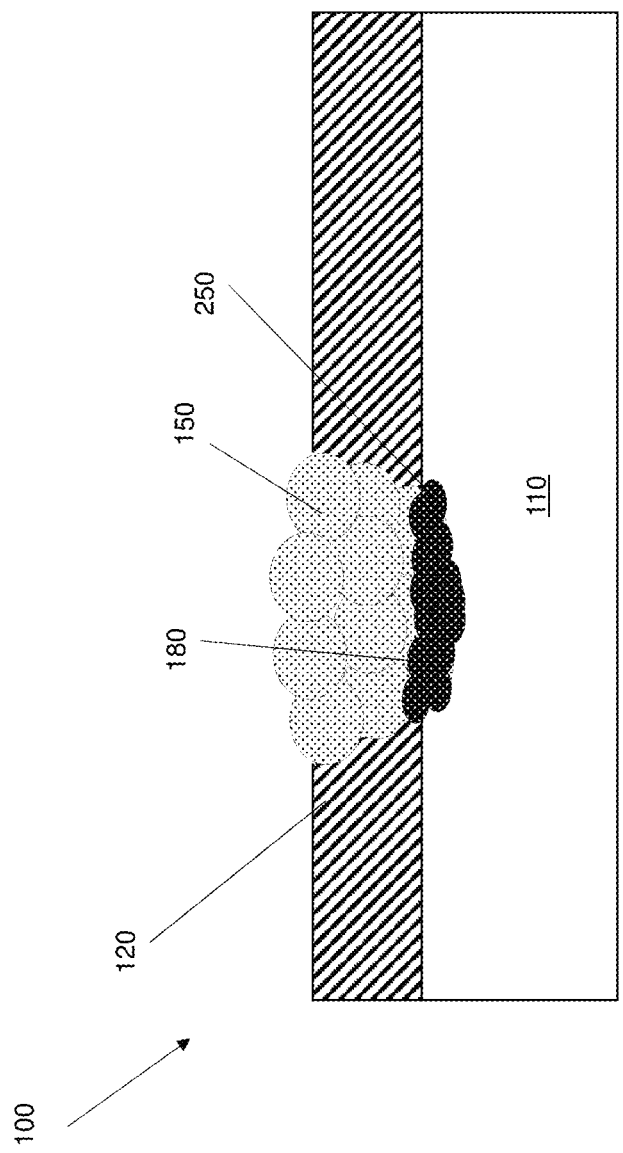
FIG. 7 shows a schematic depiction of a component having weld material repairing a damaged area extending in an exterior surface coating and a base material according to various embodiments of the disclosure.
Figure 8:
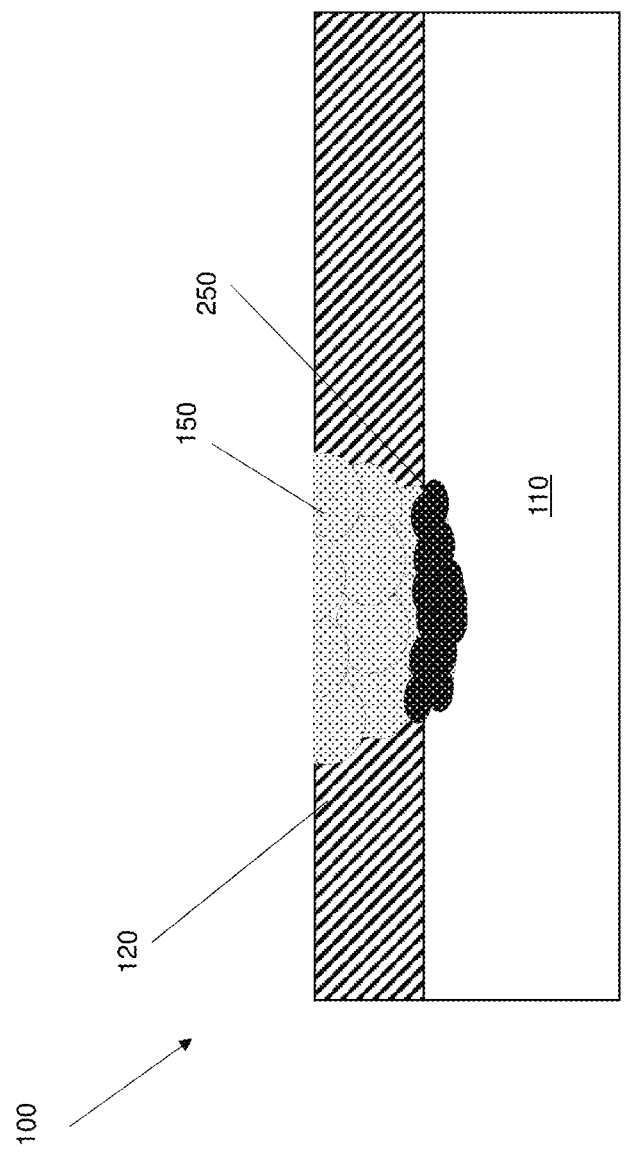
FIG. 8 shows a schematic depiction of a final repaired component of FIG. 7 according to various embodiments of the disclosure.

In another embodiment, shown in FIGS. 7-8, damaged area 130 may extend into exterior surface coating(s) 120 and base material 110. In this case, the laser irradiation process can be repeated for each of exterior surface coating(s) 120 and base material 110. That is, laser irradiation can be carried out using a first wire material 152 (FIG. 1) configured to repair damaged area 130 (FIG. 3) in base material 110, and a second laser irradiation can be carried out using a second wire material 152 configured to repair damaged area 130 in exterior surface coating(s) 120. The first and second wire material can be different. Each irradiation can follow the afore-described process customized for the particular materials, extent of damaged area 130, etc.

In an embodiment shown in FIG. 7, repair zone 140 from FIG. 4 is filled with two different materials. After repair zone 140 is formed as shown in FIG. 4, a first weld material 250 may be applied to repair zone 140, and then a second weld material 150 may be applied on first weld material 250. For example, first weld material 250 can provide a base material 110 layer, and second weld material 150 can provide an exterior surface coating(s) 120 layer. For example, second weld material 150 may include exterior surface coating(s) 120 material, while first weld material 250 includes base material 110. After first weld material 250 is created, the method may include machining first weld material 250, e.g., to create a smoother surface 180 on first weld material 250.

In FIG. 8, component 100 is returned to the shape prior to damaged area 130 (FIG. 1) existing in exterior surface coating(s) 120 through machining Excess weld material 150 or 250 may be removed by manual and/or CNC machining until the shape of component 100 is restored.

Figure 9:
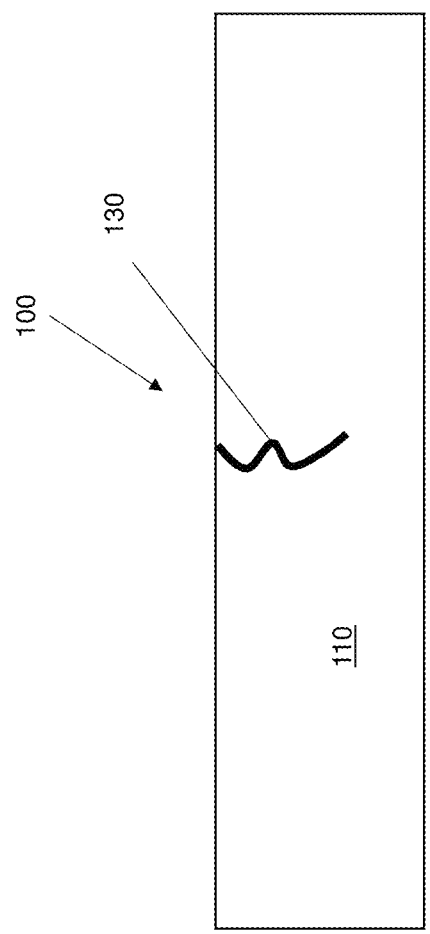
FIG. 9 shows a schematic depiction of a component including a damaged area in a base material according to various embodiments of the disclosure.

With reference to FIGS. 9-12, an alternate embodiment of repairing a damaged area 130 (FIG. 3) in a base material 110 of a component 100 is described. FIG. 9 shows a schematic depiction of a component 100 made of base material 110. Base material 110 includes damaged area 130 which can be, for example, a crack or fissure. Damaged area 130 extends into base material 110. Damaged area 130 of component 100 is generally identified through visual inspection or NDT inspection.

Figure 10:
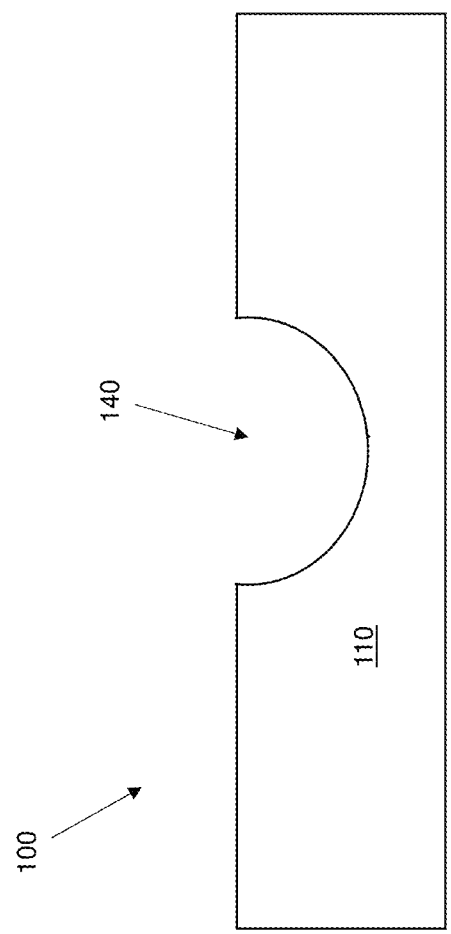
FIG. 10 shows a schematic depiction of the component of FIG. 9 subjected to a machining operation of the damaged area according to various embodiments of the disclosure.

In order to restore component 100 to shape prior to the damaged area existing, optional local machining of damaged area 130 (FIG. 9) of base material 110 is performed to provide a clean and smooth sided surface area. The results of this process is shown in FIG. 10 as a repair zone 140. Providing repair zone 140 with smooth sides may prevent contamination or inclusion and ensures no bond defects in the subsequent repair. Repair zone 140 extends into base material 110 to a depth that removes all traces of damaged area 130 (FIG. 9).

Removal of damaged area 130 is through machining such as grinding. The machining can be done manually and/or with a computer numerical controller (CNC) machine as described above. The machining removes damaged area 130 (FIG. 9) of base material 110, creating repair zone 140 having smooth sides. The machining to create repair zone 140 is inspected visually or through NDT inspection to be sure all necessary portions of damaged area 130 (FIG. 9) is removed. Where grinding is employed, the grinding may be performed with carbide tools. The heat input caused by the machining may be controlled, e.g., through stopping to allow for cooling, to limit heat input into component 100.

Figure 11:
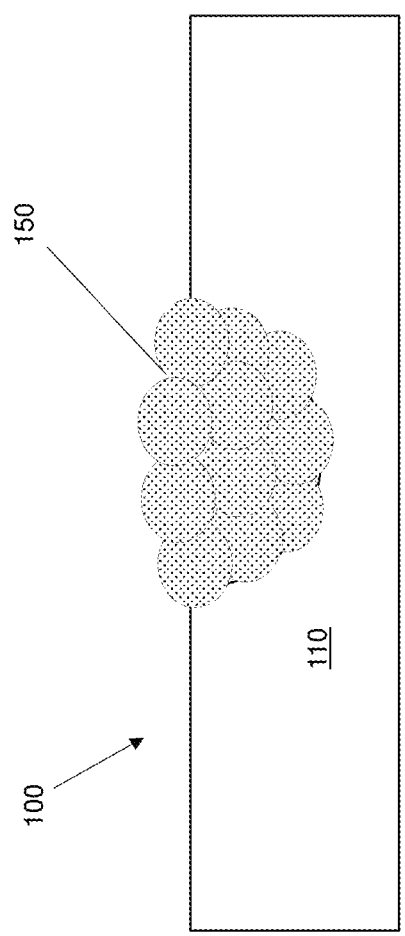
FIG. 11 shows a schematic depiction of the component of FIG. 10 including weld material in the damaged area according to various embodiments of the disclosure.

FIG. 11 shows local application of weld material 150 by means of modulated pulsed laser welding, as described herein. One or more layers of weld material 150 may be applied in repair zone 140 (FIG. 10) until repair zone 140 is completely filled with weld material 150. In embodiments, weld material 150 can be applied directly to damaged area 130 (FIG. 9).

Figure 12:
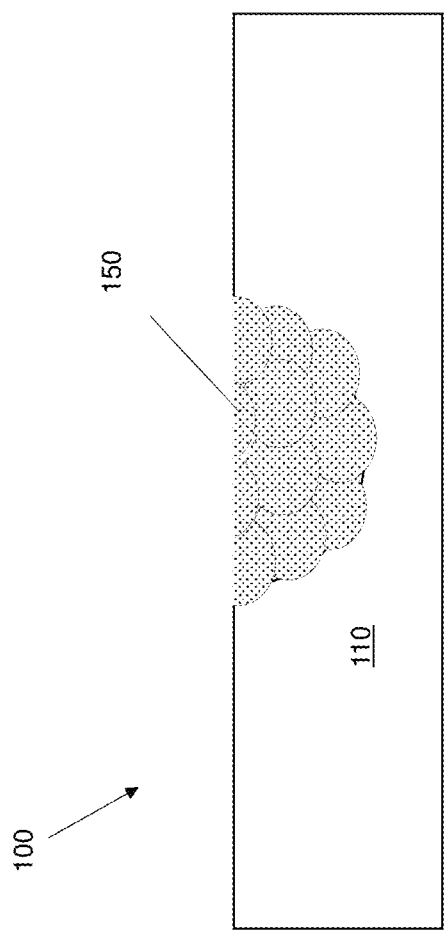
FIG. 12 shows a schematic depiction of a repaired component according to various embodiments of the disclosure.

FIG. 12 shows component 100 returned to the shape it had prior to the existence of damaged area 130 (FIG. 9). After weld material 150 has been added to repair zone 140, excess weld material 150 may be removed by manual and/or CNC machining until the shape of component 100 is restored to the shape that existed prior to the existence of the damaged area. A further advantage of the process disclosed herein is the very limited required machining effort because of the near net shape nature of weld material 150. The repair configuration and laser characteristics for the embodiments in FIGS. 9-12 are the same as described in FIGS. 7 and 8 above.

With reference to FIGS. 13-16, an alternate embodiment is described for adding weld material to an area of a component 100. FIG. 13 shows a schematic depiction of a gas turbine component 100 of, for example, base material 110. Component 100 may have an aperture 182; however, this is not necessary in all embodiments. A dotted line indicates the shape of component 100 prior to damage around aperture 182. The area enclosed by the dotted lines is damaged area 130. Damaged area 130 may be damaged by cracks, thinning of the walls, spalling etc. Damaged area 130 in FIG. 13 may be on either side of aperture 182. Damaged area 130 of component 100 is generally identified through visual inspection or NDT inspection. Component 100 may have one or more coatings disposed thereon. FIG. 13 may include, for example, a blade tip wall at the tip of an airfoil of a turbine component.

In order to restore component 100 to shape prior to the existence of damaged area 130, local grinding of component 100 of base material 110 is performed to provide a clean and regular shape area having smooth sides. This process is shown in FIG. 14 as repair zone 184. Providing repair zone 184 with smooth sides and a regular shape prevents contamination or inclusion and ensures no bond defects in the subsequent repair. Repair zone 184 removes all traces of the damage in base material 110.

Removal of damaged area 130 is through machining such as grinding. The machining can be done manually or with a computer numerical controller (CNC) machine as described above. The machining removes damaged area 130 (FIG. 13) of base material 110 creating repair zone 184 having smooth sides. The machining to create repair zone 184 is inspected visually or through NDT inspection to be sure all of damaged area 130 (FIG. 13) is removed. If grinding is performed, it can be performed with carbide tools. The heat input caused by the grinding may be controlled to limit heat input into the component 100, e.g., through periodic stopping to allow for cooling.

FIG. 15 shows local application of welding material 150, 350 by modulated pulsed laser welding. One or more layers of welded material 150 may be applied in repair zone 184 (FIG. 14) until repair zone 184 is completely filled with welded material 150. As shown in FIG. 15, the welded material 150 fills aperture 182 (FIG. 13). In embodiments, weld material 150 can be applied directly to damaged area 130 (FIG. 13). FIG. 15 also shows another embodiment of a method employing laser irradiating as described herein in how weld material 350 is added to an area 352 (FIG. 14) of component 100, i.e., to a vertical side of where damaged area 130 is not present. While shown with a repair process, the adding of weld material 350 can occur separately in time. Weld material 150 and 350 can be the same or different materials.

FIG. 16 shows component 100 including restoration of aperture 182 but also with added weld material 350 giving component 100 a new shape (relative to FIG. 13). After welded material 150 has been added to repair zone 140 and weld material 350 has been added to area 352 (FIG. 14), excess weld material 150, 350 may be removed by manual and/or CNC machining until the shape of component 100 is as desired. As shown in FIG. 16, where aperture 182 is desired, it can be reopened using, e.g., a drill. The configuration and laser characteristics for the embodiments in FIGS. 13-16 are as described in FIGS. 7 and 8 above.

Returning to FIG. 1, wire material 152 used to form weld material (150, 250, 350) according to the processes described herein may be in the form of a wire material with the dimension specifications and quality according to the following requirements. The diameter of wire material may range from 0.1 to 1.0 millimeter (mm) with a tolerance of ±0.05 mm. The roundness of wire material may be at least 0.8, where ideal roundness is indicated by 1.0. Roundness is based on the ratio between the inscribed and the circumscribed circles, i.e., the maximum and minimum sizes for circles that are just sufficient to fit inside and to enclose the shape. Straightness of wire material may be of a maximum deviation along a wire axis of ±1 mm. The wire material may have a surface roughness of, for example, no more than 25 microns.

Wire material 152 can be prepared directly from a powder form of exterior surface coating(s) 120 or base material 110, and processed to form a wire. The processing method for the wire material can be by heat treatment by laser processing, which may include selective laser melting (SLM)), powder sintering, etc.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−100% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

We claim:

1. A method for repairing a component, the method comprising:
    providing the component, the component having: an exterior surface coating disposed on a base material, and a damaged area in at least one of the exterior surface coating and the base material; and
    repairing the damaged area by advancing a first wire material into the damaged area while first laser irradiating the first wire material with a laser in an inert gas delivered through a nozzle in a vicinity of the damaged area, wherein the first laser irradiating the first wire material includes modulated pulsing the laser through:
        a first warm up phase during which an on-power of the laser is increased over time to a maximum target on-power for the first laser irradiating,
        a first melt and bond phase during which the first wire material is melted and during which the on-power for the first laser irradiating is less than the maximum target on-power for the first laser irradiating, wherein the melt and bond phase uses 50% to 90% of the maximum target on-power of the first laser irradiating target on-power, and wherein the on-power is slowly reduced as the first wire material melts, and
        a first stress releasing phase during which the on-power of the laser is less than the on-power during the melt and bond phase,
    wherein the first warm-up phase expends from 0.1 to 5 percent of a laser irradiating total duration, wherein the first melt and bond phase expends from 4.9 percent to 30 percent of the laser irradiating total duration, and wherein the first stress releasing phase expends from 65 percent to 95 percent of the laser irradiating total duration, and
    wherein the laser irradiating has a total duration of 55 milliseconds (ms) to 85 ms, wherein a peak power value is between 0.6 kilowatts (kW) and less than 1.5 kW, and wherein the first laser irradiated wire material forms a first weld material in the damaged area.

2. The method of claim 1, wherein the damaged area extends only into the exterior surface coating, and the first wire material is selected to repair the exterior surface coating only.

3. The method of claim 2, wherein the first wire material is selected from the group consisting of: MCrAlY, where M includes nickel (Ni) or cobalt (Co); cobalt nickel (CoNi); nickel cobalt (NiCo); chromium carbide ($Cr_3C_2$); or tungsten carbide (WC).

4. The method of claim 1, wherein the damaged area extends into the exterior surface coating and the base material, and the first wire material is configured to repair the damaged area in the base material, and
    wherein the repairing further comprises:
        machining the first weld material; and
        advancing a second wire material into the damaged area of the exterior surface coating while second laser irradiating the second wire material with the laser in an inert gas in a vicinity of the damaged area of the exterior surface coating, wherein the second laser irradiating the second wire material includes modulated pulsing the laser through:
            a second warm up phase during which the on-power of the laser is increased over time to a maximum target on-power for the second laser irradiating,
            a second melt and bond phase during which the second wire material is melted and during which the on-power for the second laser irradiating is less than the maximum target on-power for the second laser irradiating, and
            a second stress releasing phase during which the on-power of the laser is less than the on-power during the melt and bond phase,
    wherein the second laser irradiated the second wire material forms a second weld material in the damaged area of the exterior surface coating and on the first weld material.

5. The method of claim 4, wherein the first wire material and the second wire material are different.

6. The method of claim 5, wherein the first wire material is selected from the group consisting of: a nickel-based superalloy and a cobalt-based superalloy; and
    wherein the second wire material is selected from the group consisting of: MCrAlY, where M includes nickel (Ni) or cobalt (Co); cobalt nickel (CoNi); nickel cobalt (NICO); CHROMIUM CARBIDE ($Cr_3C_2$); OR TUNGSTEN CARBIDE (WC).

7. A method for repairing a component, the method comprising:
    providing the component, the component having a base material having a damaged area; and
    repairing the damaged area by advancing a wire material into the damaged area while laser irradiating the wire material with a laser in an inert gas delivered through a nozzle in a vicinity of the damaged area, wherein the laser irradiating the wire material includes modulated pulsing the laser through:

a warm up phase during which an on-power of the laser is increased over time to a maximum target on-power for the laser irradiating, a melt and bond phase during which the wire material is melted and during which the on-power for the laser irradiating is less than the maximum target on-power for the laser irradiating, wherein the melt and bond phase uses 50% to 90% of the maximum target on-power of the laser irradiating target on-power, and wherein the on-power is slowly reduced as the wire material melts, and a stress releasing phase during which the on-power of the laser is less than the on-power during the melt and bond phase, wherein the warm-up phase expends from 0.1 to 5 percent of a laser irradiating total duration, wherein the melt and bond phase expends from 4.9 percent to 30 percent of the laser irradiating total duration, and wherein the stress releasing phase expends from 65 percent to 95 percent of the laser irradiating total duration, and wherein the laser irradiating has a total duration of 55 milliseconds (ms) to 85 ms, wherein a peak power value is between 0.6 kilowatts (kW) and less than 1.5 kW, and wherein the laser irradiated wire material forms a weld material in the damaged area.

8. The method of claim 7, wherein the base material comprises a nickel-based superalloy or a cobalt-based superalloy, and wherein the wire material is selected from the group consisting of: MCrAlY, where M includes nickel (Ni) or cobalt (Co); cobalt nickel (CoNi); nickel cobalt (NiCo); chromium carbide ($Cr_3C_2$); or tungsten carbide (WC).

9. The method of claim 7, wherein a modulated pulse frequency of the laser is between 12 hertz (Hz) and 20 Hz.

10. A method, comprising:

providing a component, the component having a base material;

adding material to an area of the component by laser irradiating a wire material with a laser in an inert gas delivered through a nozzle in a vicinity of the area of the component, wherein the laser irradiating the wire material includes modulated pulsing the laser through:

a warm up phase during which an on-power of the laser is increased over time to a maximum target on-power for the laser irradiating, a melt and bond phase during which the wire material is melted and during which the on-power for the laser irradiating is less than the maximum target on-power for the laser irradiating, wherein the melt and bond phase uses 50% to 90% of the maximum target on-power of the laser irradiating target on-power, and wherein the on-power is slowly reduced as the wire material melts, and a stress releasing phase during which the on-power of the laser is less than the on-power during the melt and bond phase, wherein the warm-up phase expends from 0.1 to 5 percent of a laser irradiating total duration, wherein the melt and bond phase expends from 4.9 percent to 30 percent of the laser irradiating total duration, and wherein the stress releasing phase expends from 65 percent to 95 percent of the laser irradiating total duration, and wherein the laser irradiating has a total duration of 55 milliseconds (ms) to 85 ms, wherein a peak power value is between 0.6 kilowatts (kW) and less than 1.5 kW, and wherein the irradiated wire material forms a weld material to the area of the component.

11. The method of claim 10, wherein the wire material is selected from the group consisting of: a nickel-based superalloy and a cobalt-based superalloy.

12. The method of claim 10, wherein the wire material is selected from the group consisting of: MCrAlY, where M includes nickel (Ni) or cobalt (Co); cobalt nickel (CoNi); nickel cobalt (NiCo); chromium carbide ($Cr_3C_2$); or tungsten carbide (WC).

13. The method of claim 10, wherein a modulated pulse frequency of the laser is between 12 hertz (Hz) and 20 Hz.

* * * * *